United States Patent [19]

Meidan et al.

[11] Patent Number: 5,506,863
[45] Date of Patent: Apr. 9, 1996

[54] METHOD AND APPARATUS FOR OPERATING WITH A HOPPING CONTROL CHANNEL IN A COMMUNICATION SYSTEM

[75] Inventors: Reuven Meidan, Ramat Hasharon, Israel; Duane C. Rabe, Rolling Meadows; Michael D. Kotzin, Buffalo Grove, both of Ill.

[73] Assignee: Motorola, Inc., Schaumburg, Ill.

[21] Appl. No.: 112,820

[22] Filed: Aug. 25, 1993

[51] Int. Cl.$^6$ .................................................. H04B 1/713
[52] U.S. Cl. ............................ 375/202; 375/200; 380/34
[58] Field of Search ............................... 375/1, 200–210; 380/34; 342/352, 357

[56] References Cited

U.S. PATENT DOCUMENTS

| | | | |
|---|---|---|---|
| 4,554,668 | 11/1985 | Deman et al. | 375/1 |
| 4,807,248 | 2/1989 | Pyatt et al. | 375/1 |
| 5,079,768 | 1/1992 | Flammer | 375/1 X |
| 5,097,485 | 3/1992 | O'Connor et al. | 375/1 X |
| 5,123,029 | 6/1992 | Bantz et al. | 375/1 |
| 5,130,987 | 7/1992 | Flammer | 375/1 X |
| 5,177,765 | 1/1993 | Holland et al. | 375/1 |
| 5,210,771 | 5/1993 | Schaeffer et al. | 375/1 |
| 5,212,715 | 5/1993 | Pickert et al. | 375/114 |
| 5,287,384 | 2/1994 | Avery et al. | 375/1 |
| 5,291,475 | 3/1994 | Bruckert | 375/1 X |

*Primary Examiner*—Bernarr E. Gregory
*Attorney, Agent, or Firm*—Richard A. Sonnentag; Kevin A. Buford

[57] ABSTRACT

A communication unit for use in a communication system is provided which includes a hopping mechanism which hops communication frames over a plurality of carrier frequencies according to a predetermined hopping pattern. At least one of the communication frames preferably includes a synchronization channel time slot having data bits from which the predetermined hopping pattern may be derived. In addition, a communication unit is provided which includes a signal acquisition mechanism for initially acquiring a predetermined hopping pattern that specifies the sequence over which hop frames are hopped over a plurality of carrier frequencies. Also, this communication unit includes a hopping mechanism for hopping receiving frequency according to the predetermined hopping pattern such that a control channel may be detected. In an alternative embodiment, either communication unit may derive the predetermined hopping pattern from detected global position satellite information.

31 Claims, 5 Drawing Sheets

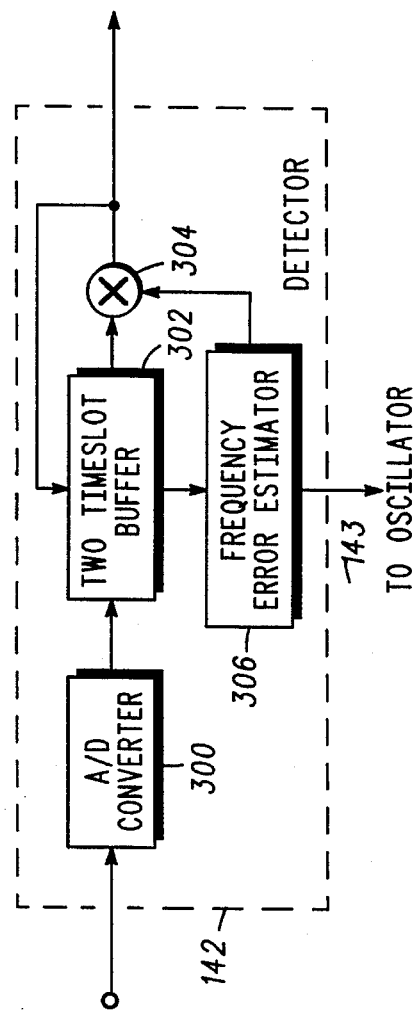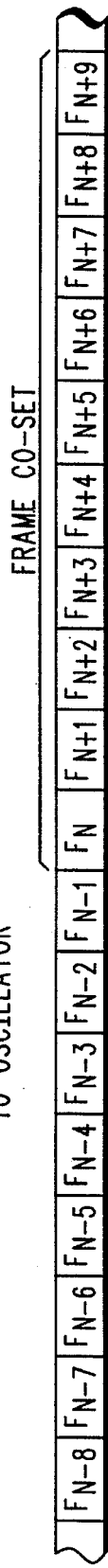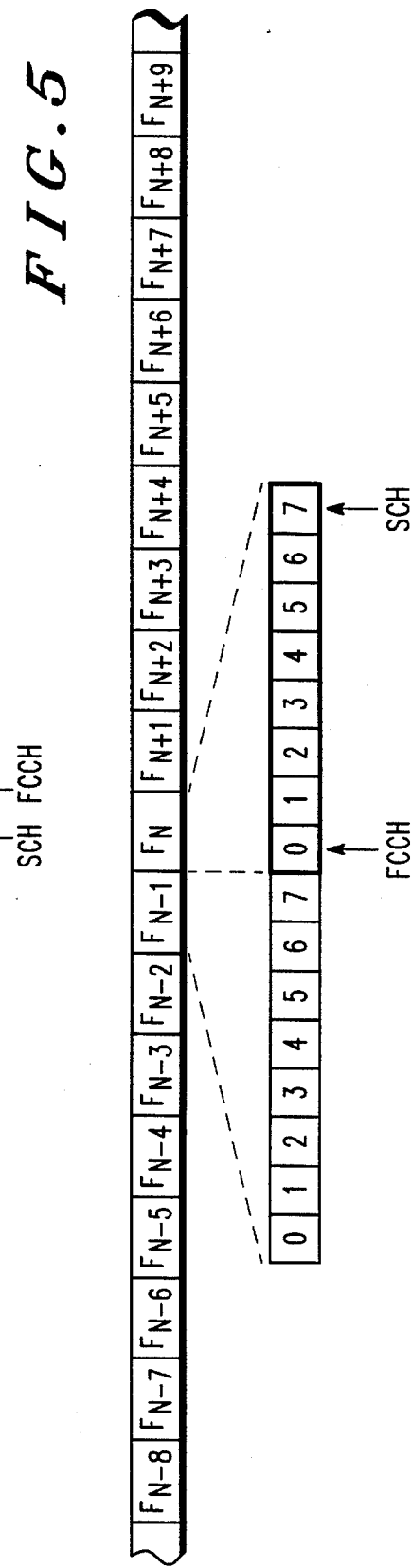

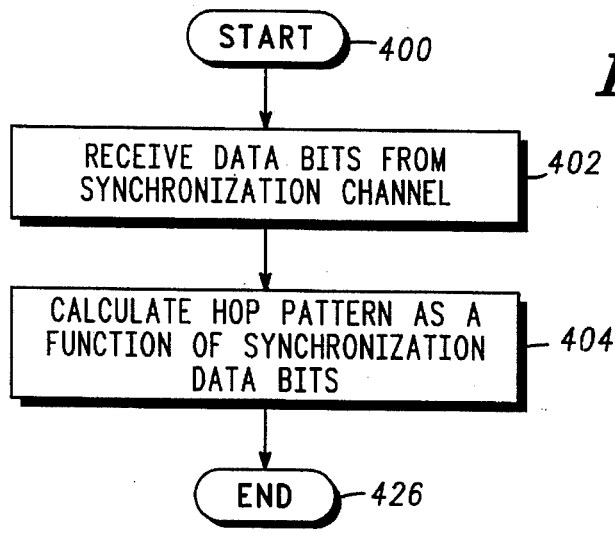
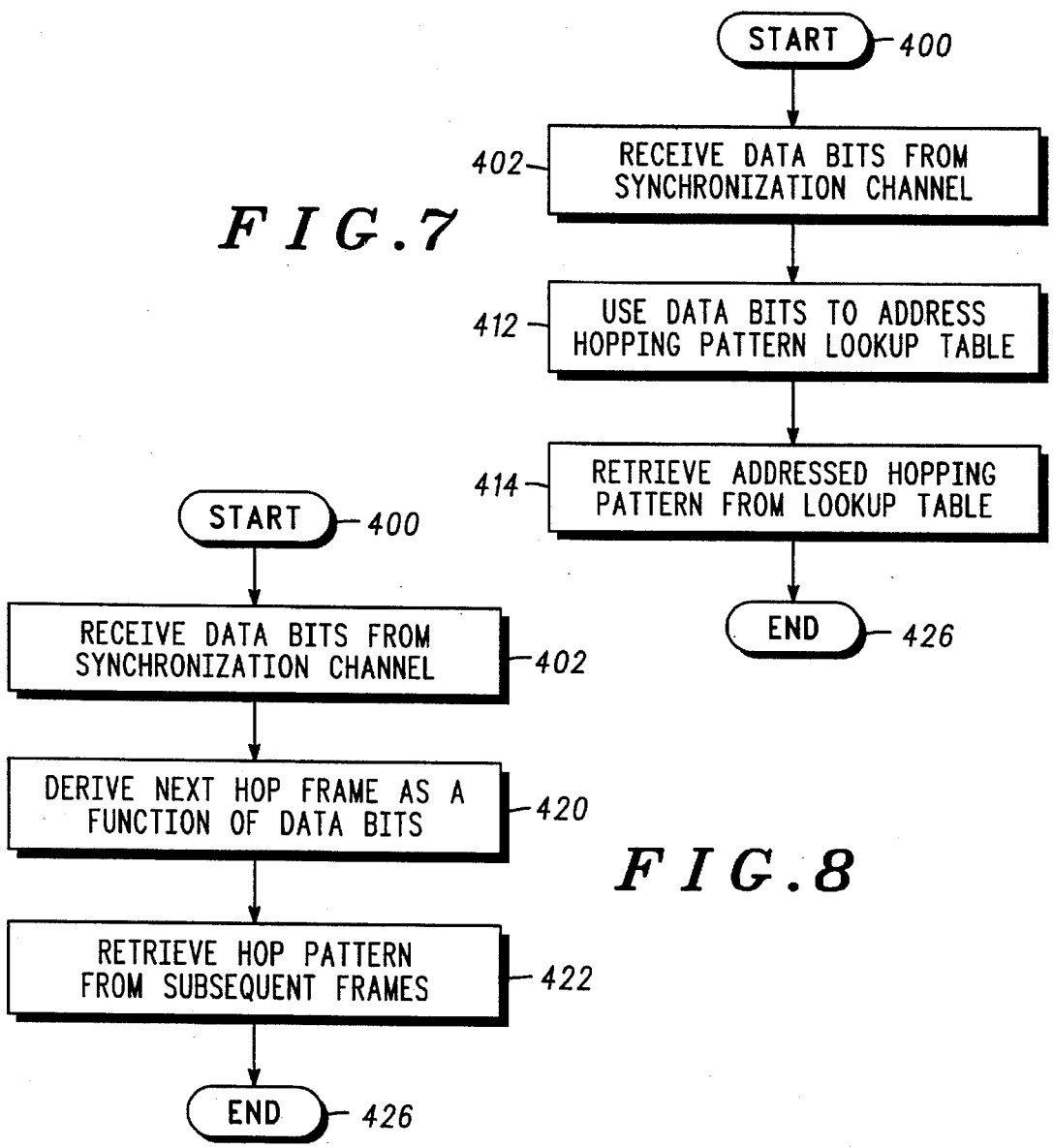
FIG.6
FIG.7
FIG.8

METHOD AND APPARATUS FOR OPERATING WITH A HOPPING CONTROL CHANNEL IN A COMMUNICATION SYSTEM

RELATED INVENTION

The present invention is related to U.S. patent application Ser. No. 07/955,793 filed on Oct. 2, 1992, by Borth et al. which is entitled "Method and Apparatus for Frequency Hopping a Signaling Channel in a Communication System" and was assigned to the assignee of the present invention, now U.S. Pat. No. 5,381,443.

FIELD OF THE INVENTION

The present invention relates to communication systems which employ time division multiple access (TDMA) signals and, more particularly, to a method and apparatus for operating with a hopping control channel in a communication system.

BACKGROUND OF THE INVENTION

In a TDMA communication system, such as the European digital cellular radiotelephone systems which are set forth in the open air interface Global System for Mobile Communications (GSM) standard (Copies of GSM are available from European Telecommunications Standards Institute, ETSI Secretariat: B.P.152.F-06561 Valbonne Cedex, France) or a derivative thereof such as Digital Cellular System 1800 MegaHertz (DCS1800), there are typically a plurality of radio frequencies employed at each base site. Each frequency is time partitioned into frames, each having several time slots. Each time slot may carry radiotelephone communication between a particular base site and a subscriber unit (i.e., mobile communication unit) located within the coverage area of the particular base site.

In addition, the performance of TDMA communication systems can be improved by introducing a frequency hopping pattern to the signal modulation process. Frequency hopping helps a communication system maintain the integrity of a communication channel by providing frequency diversity. This, in combination with the channel coding and interleaving, mitigates the effects of Rayleigh fading. In addition, frequency hopping is an important counter-measure which reduces a channel's susceptibility to co-channel interference and jamming (which was intended or accidental in nature).

Frequency hopping consists of shifting the carrier frequency of a particular information signal in discrete increments in a pattern dictated by a code sequence or pattern. In particular, the transmitter jumps from frequency to frequency according to a code sequence. Frequency hopping communication systems can be divided into slow frequency hopping (SFH) and fast frequency hopping (FFH) communication systems, In SFH communication systems, several data symbols, representing a sequence of data bits (e.g., an information signal), modulate the carder wave within a single hop. Whereas, in FFH communication systems, the carrier wave hops several times per data symbol.

In an SFH communication system, multiple communication channels are accommodated by the assignment of portions of a broad frequency band and/or time slot to each particular channel. For example, communication between two communication units in a particular communication channel is accomplished by using a frequency synthesizer to generate a carrier wave in a particular portion of a predetermined broad frequency band for a brief period of time. The frequency synthesizer uses an input hopping code to determine the particular frequency from within the set of frequencies in the broad frequency band which the carrier wave will be transmitted on. Hopping codes are input to the frequency synthesizer by a hopping code generator. The hopping code generator is periodically clocked or stepped through different transitions which cause different or shifted hopping codes to be output to the frequency synthesizer. Therefore, as the hopping code generator is periodically clocked, then so too is the carrier wave frequency hopped or reassigned to different portions of the broad frequency band.

Multiple communication channels are allocated by using a plurality of hopping codes to assign portions of the frequency band to different channels during the same time period. As a result, transmitted signals are in the same broad frequency band of the communication channel, but within unique portions of the broad frequency band assigned by the unique hopping codes. These unique hopping codes preferably are orthogonal to one another for each cell or communication service region such that the cross-correlation between the hopping codes is zero.

In the GSM standard, a scheme for frequency hopping traffic channels in time slots is described. If this scheme is implemented significant performance improvements can be obtained. However, in the GSM system, the control channel is not designed to hop, because the system was optimized for a simplified acquisition by subscriber units to the communication system. Therefore, in order to provide simplified access, the control channel is transmitted at a fixed frequency so that it acts like a beacon for subscriber units to use in acquiring the communication system (e.g., the control channel beacon is used to frequency tune and time align the subscriber unit to the communication system). However, this makes the control channel vulnerable to jamming and Rayleigh fading. Therefore, a need exists for a scheme to accommodate frequency hopping of the control channel, while still allowing the mobile units to acquire the communication system.

BRIEF DESCRIPTION OF THE DRAWINGS

FIG. 3 is a block diagram showing a preferred embodiment detector for use in either communication unit shown in FIGS. 1 or 2 in accordance with the present invention.

FIGS. 4 and 5 are diagrams showing two different preferred embodiment frame structures for use in a communication system having a hopped control channel in accordance with the present invention.

FIGS. 6, 7, and 8 are flowcharts showing three different preferred embodiment techniques for obtaining a hopping pattern in accordance with the present invention.

DETAILED DESCRIPTION

Figure 1:
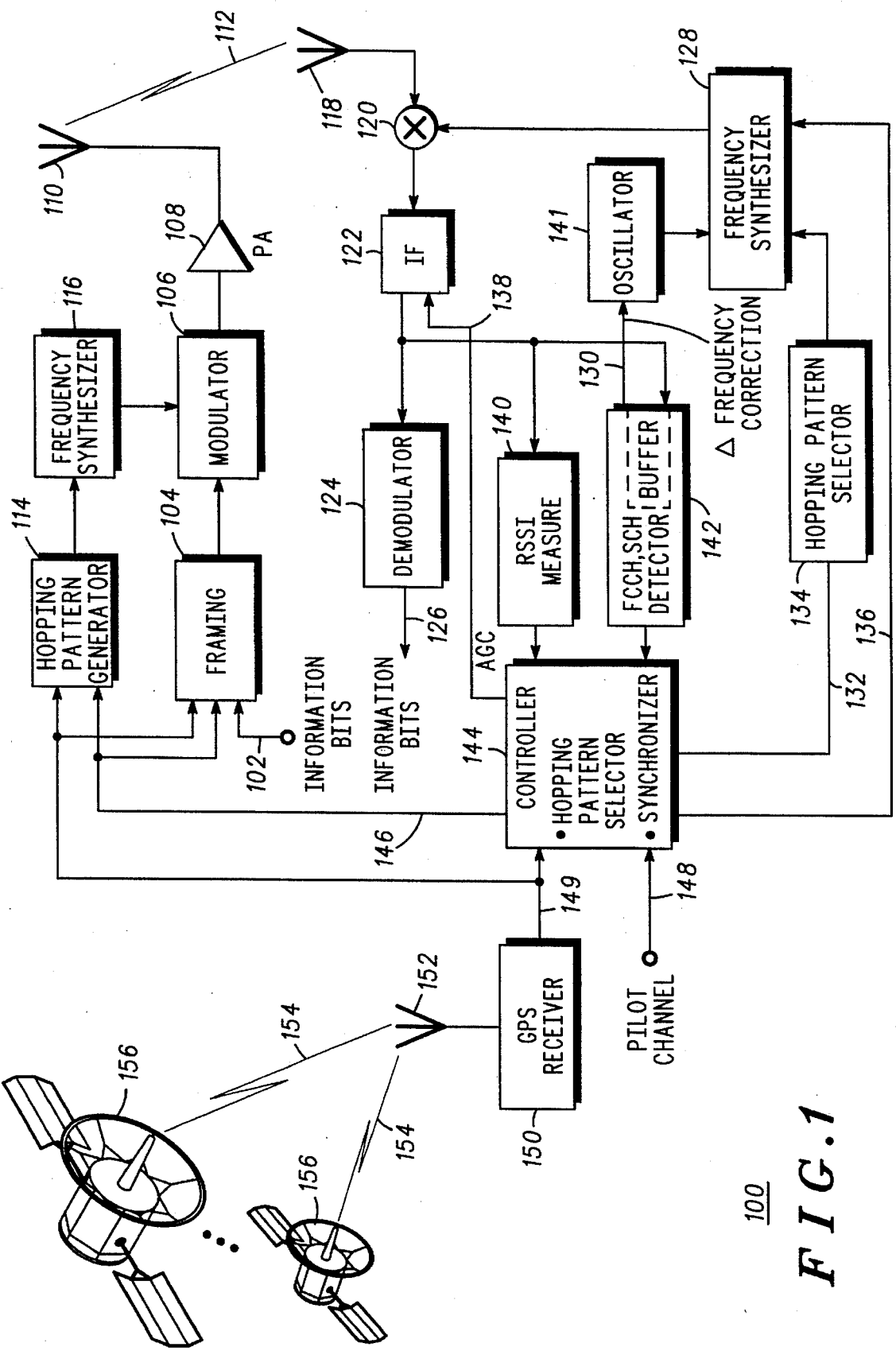
FIG. 1 is a block diagram showing a preferred embodiment subscriber communication unit for use in a communication system in accordance with the present invention.

In current GSM systems, which are non-hopping control channel systems, there are two types of control information which must be acquired by the subscriber unit before the subscriber can access a traffic channel. The first type of information is frequency correction information. This is provided in a frequency correction channel (FCCH). The FCCH is a pure sine wave inserted periodically in a time slot in certain frames which is used by the communication unit to correct its local oscillator to within a range of the base station transmitter's frequency. In addition, this frequency detection will provide a coarse time alignment to the time slot structure. This information is provided on a carrier used by the system, where the carrier is time partitioned into frames and each frame is divided into several time slots.

The second type of information needed by the subscriber unit in order to acquire the communication system is the synchronization information. This is provided in a synchronization channel (SCH). The SCH is a time slot inserted periodically in certain frames. In the SCH time slot, accurate timing information is determined by use of a specific synchronization word. The location of the correlation peak for a training sequence within the synchronization word in the SCH may be used to yield timing for the communication system to within a symbol period.

Because of the amount of information to be transferred by the FCCH and SCH, they are typically not provided in the same time slot. Further, due to the complexity of the signal processing necessary for detection of the FCCH and SCH, they are typically not provided in the same frame. In order to utilize the least amount of spectrum (i.e., channel usage) for the control channel (leaving as much as possible for the traffic channels) both the FCCH and SCH are periodically sent in different frames, but in the same time slot (e.g., time slot 0). To accomplish this, the FCCH is sent in one frame ($F_N$) and the SCH is sent in another frame ($F_{N+1}$). Several frames may not have either the FCCH or the SCH so that more control channels may be provided in the communication system. In GSM, the frames are grouped into frame co-sets, as illustrated in FIG. 4. This frame co-set consists of ten frames. In this embodiment, the FCCH and the SCH are transmitted in only one frame of the co-set.

Once this FCCH and SCH information has been obtained by the communication unit, it can transfer and receive messages over the other control channels and receive its traffic channel assignment. These other control channels include: a Slow Dedicated Control Channel (SDCCH), Paging Channel (PCH), Random Access Channel (RACCH), and/or Access Grant Channel (AGCH) may be used by the communication system. Some of these control channels are only used with the uplink (i.e., subscriber-to-base site communication unit) or downlink (i.e., base site-to-subscriber communication unit) communications.

In practice, a communication unit will scan several frequencies and measure a quality factor, such as signal strength, at each frequency. Subsequently, the communication unit prioritizes the frequencies from highest to lowest signal strength (i.e., the closest base site communication unit will likely have the highest signal strength). The communication unit will then go to the frequency having the best quality factor and obtain the frequency correction from the FCCH (frame $F_N$, slot 0) and the synchronization and hopping pattern from the SCH (frame $F_{N+1}$, slot 0). In the non-hopping system, this takes two frames to accomplish.

As indicated, the above description was for a non-hopping control channel system. However, the GSM standard does allow for frequency hopping; but only for the traffic channels. The control channels remain at fixed frequencies. This is accomplished by making time slot 0 of some frames at certain frequencies the control channel. The information needed by the communication unit to begin hopping the traffic channel is obtained over two consecutive frames having control slots (i.e., FCCH and SCH) as well as a later transmitted frame having a control slot(i.e., a broadcast control channel).

The acquisition process is made more difficult when the control channel is also hopped. This will change the amount of time the communication unit will be required to "camp out" on a single frequency to obtain the necessary control information. In a hopping control channel system which hops on a frame-by-frame basis, the FCCH will be contained in frame $F_N$ at a certain frequency whereas the SCH will be contained in the following frame $F_{N+1}$ at another frequency. An example of this type of process is described in the above identified related invention.

A problem with the above-referenced implementation is that when the subscriber unit is not "a priori" provided with the sequence over which the frequencies are hopped, it does not know which frequency the SCH will be located in after the FCCH is detected. In addition, another problem is when there is a jammer attempting to jam the communication system. It is not desirable to have all communication units "a priori" know the sequence over which the frequencies are hopped. In such a system, the jammer will try to access the frequency being used by the communication unit (e.g., the frequency which carries the SCH and/or FCCH) and put out enough noise at that frequency such that the subscriber communication unit will not be able to recover the transmitted signal.

It is easier for the jammer to try to keep the communication unit from gaining access to the system by jamming the control signals. When jamming a signal, it is very difficult for the jammer to identify the random data bits transmitted in the traffic channels. While it is a little easier to try to identify the synchronization word in the SCH, this is only a small part of that time slot and it is likewise difficult to identify in time to jam. This leaves the FCCH which, as stated above is a pure sine wave time slot. The jammer can detect this time slot; lock to that frequency; and begin jamming the signal. This can be done in time to jam the SCH and prevent the communication unit from obtaining the hopping pattern. This, in effect, blocks the communication unit from the system.

The present invention provides a system design as well as the associated communication units (base and subscriber) for implementing the system design. This design addresses several of the issues noted above including not "a priori" knowing the frequency hopping sequence by the subscriber unit and jamming.

In accordance with the present invention, two alternative hopping control channel solutions are proposed. For these solutions, the SCH, in addition to the synchronization word, will also provide the communication unit with the hopping pattern, or spreading code. This code may be the specific hopping pattern or can be an identifier of the hopping pattern. The identifier would then be used by the communication unit to generate the hopping pattern. In the first solution, as shown in FIG. 4, the SCH is placed in a time slot before the FCCH. Since the jammer will be looking for the FCCH, the design in FIG. 4 will enable the communication unit to receive the SCH before the jamming starts. In addition, enough of the FCCH signal can be obtained before jamming begins to enable the communication unit to adjust its frequency accordingly. In this solution, the SCH has been received and is safely stored in a receiver buffer when the FCCH is sent. As such, an interference signal (e.g., a jamming signal) would be ineffective. Since the jammer would not know where to find the next frequency in the hopping sequence, the communications unit would be able to acquire the traffic channel and conduct the communication.

To implement this first solution, a buffer is required to store the SCH. In addition, the frequency reference source (i.e., the local oscillator) must be corrected accurately enough during the FCCH detection so that the samples within the stored SCH can be frequency corrected. For example, if the buffered samples of the SCH are $r_n$, then for an assumed frequency error the sample ($r_n$) must be corrected as frequency corrected sample $\tilde{r}_n = r_n e^{-j2\pi \Delta f n T_s}$ where $r_n$ is the original sample stored in the buffer, $\tilde{r}_n$ is the frequency corrected sample, $\Delta f$ is the frequency correction term, and $T_s$ is the sampling interval.

In the second hopping control channel solution, as shown in FIG. 5, the SCH and FCCH are in the same frame, but separated by several intermediate slots. The advantage of this solution is that if the GSM receiver is already capable of receiving and processing two slots within seven slots (typically it must receive two slots within at least eight slots) then no additional hardware redesign of the communication unit is needed. Unlike the first solution, only the same one slot buffer, used in known GSM receivers is used in the second solution. Only software, which implements slow frequency hopping (i.e., varying the output of the frequency synthesizer on a frame by frame basis) is needed. This second solution, like the first solution, is still useful in reducing or eliminating the effects of some types of interference in the acquisition of a system. Besides jamming, these types of interference include: co-channel interference, co-site interference, sun spots, and any other type of intermittent interference (e.g., point-to-point communications).

In accordance with the second hopping control channel solution (as shown in FIG. 5), the FCCH is transmitted in the first time slot of a frame (e.g., frame $F_N$ in slot 0) and the SCH is transmitted in the eighth slot of the same frame (e.g., frame $F_N$ in slot 7). A communication unit which operates according to this second solution will operate in substantially the same manner as was described above in reference to the first solution, except that a two slot buffering mechanism (i.e., memory device) is not needed. The communication unit can detect the FCCH from data samples of the first slot of a frame, calculate the frequency correction term, adjust the local oscillator according to the frequency correction term, purge the buffer which stores these data samples, and then ready itself to detect the SCH from data samples of the eighth slot of the same frame. This would function for most types of interference, except deliberate jamming.

It should be noted that the location of the FCCH can be used as information which indicates the location of the SCH. For example, if in accordance with the first hopping control channel solution the FCCH is received in the second time slot of a frame, then the SCH is located in an earlier transmitted time slot within the same frame. Also, if in accordance with the second hopping control channel solution the FCCH is received in the first time slot of a frame, then the SCH is located in a later transmitted time slot within the same frame Three different preferred embodiment methods for obtaining a hopping pattern in accordance with the present invention are illustrated in FIGS. 6, 7, and 8. In each method, data samples (i.e., bits) are received 402 from the SCH. Subsequently, the predetermined hopping pattern is selected according to one of three different methods. The first method consists of using 412 the synchronization channel time slot data bits to address a hopping pattern lookup table and then retrieve 414 a particular addressed hopping pattern from the lookup table. The second method consists of deriving 420 the carrier frequency of the next frame within the predetermined hopping pattern and then retrieving 422 the hopping pattern from a subsequent frame or frames. Finally, the third method consists of deriving 404 the hopping pattern as a function of the synchronization channel time slot data bits directly (e.g., the next frames are pointed to by the data bits).

One implementation of the third method is to derive the hopping pattern as a function of a frame number. The time division multiple access frame number may be initially acquired by determining the time division multiple access frame number from the synchronization channel time slot data bits. Alternatively, the time division multiple access frame number may be initially acquired by determining a "reduced" time division multiple access frame number from the synchronization channel time slot data bits. This "reduced" time division multiple access frame number identifies a co-set of time division multiple access frames including a single synchronization channel time slot within a predetermined time division multiple access frame of the time division multiple access frame co-set. Subsequently, the frame number is determined from the determined reduced frame number and the predetermined frame of the frame co-set. Once the time division multiple access frame number is acquired, the predetermined hopping pattern may be determined by using the acquired frame number to retrieve a particular hopping pattern from a lookup table of hopping patterns. Alternatively, the hopping pattern may be determined directly from the acquired time division multiple access frame number.

Figure 2:
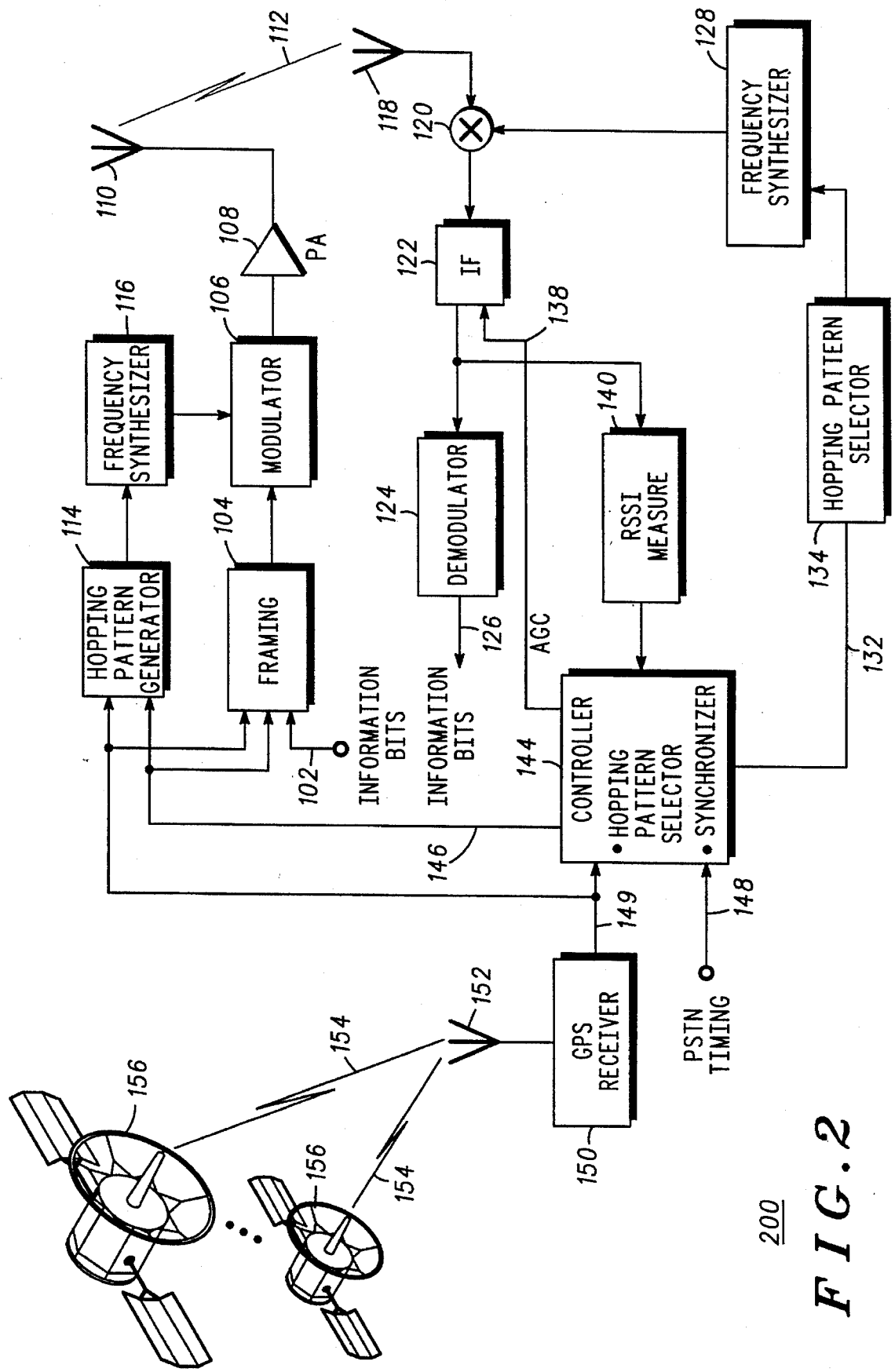
FIG. 2 is a block diagram showing a preferred embodiment base site communication unit for use in a communication system in accordance with the present invention.

Referring now to FIG. 2, a preferred embodiment base site communication unit 200 for use in a slow frequency hopping communication system in accordance with the present invention is shown. Information bits 102 are input to the transmitting portion of the base site 200. It will be appreciated by those skilled in the art that the information bits 102 may consist of digitized voice, data, or a combination thereof. The information bits 102 are input to a framing device 104 which divides the incoming information bits 102 into discrete groups which are to be transmitted as a group in individual time slots within a frame structure. The frame structure preferably is derived in part from a synchronization signal 146 coming from the receiving portion of base site 200.

In an alternative embodiment, another type of synchronization signal 149 may be used by base site 200. Synchronization signal 149 is generated as a function of global position satellite (GPS) information received over a communication channel 154 from one or more satellites 156 through an antenna 152 by a GPS receiver 150. GPS receiver 152 preferably acquires the current time of day and/or location of the demodulator as the GPS information from the one or more satellites 156. It will be appreciated by those skilled in the art that the operation of a GPS receiver 150 is well known in the art.

Either synchronization signal 146 or 149 is used by framing device 104 to synchronize a local oscillator 141 to the SFH communication system. The local oscillator 141 provides a clock signal to framing device 104 which in turn groups the incoming information bits 102 based on the clock signal. These information bits 102 may consist of information to be transmitted over one or more control and traffic channels (e.g., in a base site communication unit several information sources are multiplexed together into frames by the framing device 104 so that each time slot carries information of individual control and traffic channels that each come from several information sources).

In the preferred embodiment, the information bits 102 include control information used by a subscriber communication unit 100 (shown in FIG. 1) to initially synchronize to the SFH communication system, maintain synchronization, and to obtain system information. This control information consists of at least a frequency correction channel (FCCH) and a synchronization channel (SCH). These two "logical" channels, as shown in FIGS. 4 and 5, are multiplexed onto a single "physical" channel such that they are transmitted in the same frequencies and frames. In the preferred embodiment, as shown in FIG. 4, the SCH is transmitted in slot 0 of a frame and the FCCH is transmitted in slot 1 of the same frame. In an alternative embodiment, as shown in FIG. 5, the FCCH is transmitted in slot 0 of a frame and the SCH is transmitted in slot 7 of the same frame.

The frames to be transmitted are logically grouped into frame co-sets by framing device 104 such that the FCCH and SCH are transmitted in only one frame of a frame co-set. In one preferred embodiment, a frame co-set consists of ten frames such that the FCCH and SCH are only transmitted approximately once every ten frames (i.e., five times in a 51 frame multiframe). In this system the SCH includes a "reduced" frame number which specifies which co-set (i.e., a co-set number) is being received. Further, the "full" frame number is calculated by a priori knowing that the SCH is transmitted in a particular frame (e.g., the second out of ten frames) within the co-set. Thus, in this example, the frame number is the co-set number plus two frames. It will be appreciated by those skilled in the art that other types of control information may also be inserted into the information bits 102.

Once the information bits 102 to be transmitted are organized, a hopping pattern generator 114 is used to generate at least one of a plurality of hopping patterns from a group of hopping patterns. Hopping pattern generator 114 is periodically clocked or stepped through different transitions by synchronization signals 146 or 149 to cause different or shifted hopping patterns to be output to a frequency synthesizer 116.

Frequency synthesizer 116 generates a carrier wave at a particular narrow band of a broad frequency band for a brief period of time. The particular narrow band that frequency synthesizer 116 generates is selected from a plurality of narrow bands as specified by the hopping pattern. As hopping pattern generator 114 is periodically clocked, then so too is the carrier wave frequency hopped to different portions of the frequency band by frequency synthesizer 116.

The frequency hopping carrier wave is input to a modulator 106. Modulator 106 modulates the carrier wave with the framed information bits output by framing device 104. It will be appreciated by those skilled in the art that modulator 106 may modulate the carrier wave with any one of several modulation techniques such as frequency shift keying (FSK), minimum shift keying (MSK), Gaussian minimum shift keying (GMSK), or phase shift keying (PSK) including any derivatives thereof such as binary or quadrature phase shift keying (BPSK or QPSK) without departing from the scope or spirit of the present invention.

A signal ready for transmission over a communication channel 112 (e.g., radio link or wire line) is output by modulator 106. However, the transmission signal output by modulator 106 may be too weak to transmit over the communication channel 112. If this is the case, then the transmission signal may be amplified by a power amplifier (PA) 108, prior to its transmission by antenna 110 over the communication channel 112.

FIG. I shows a receiving portion for the preferred embodiment subscriber communication unit 100 for use in a SFH communication system in accordance with the present invention. A signal is received by antenna 118 over communication channel 112 from a base site communication unit 200. This received signal is input to a mixer 120 which receives a fixed carrier wave signal from frequency synthesizer 128 and mixes (e.g., multiplied) it with the received signal. Subsequently, a down-converter 122 converts the received signal to an intermediate frequency (IF) which can more easily be manipulated by other receiver components.

This down-converted received signal is then input to a FCCH, SCH detector 142. In FIG. 3, a preferred embodiment detector 142 is shown. The down-converted received signal is input to an analog-to-digital (A/D) converter 300 which digitizes the received analog signal into a stream of data samples. The data samples are stored in a buffer 302 which preferably is capable of buffering two time slots worth of data samples. As data is stored, the detector 142 searches for and measures the frequency of an FCCH, which in this example, would be in the second time slot of the frame. This FCCH will provide a coarse time alignment to the time slot structure of the SFH communication system. Once the FCCH is detected, subscriber communication unit 100 will freeze the buffer 302. The stored data samples in the frozen buffer 302 belonging to an FCCH are used by a frequency error estimator 306 to generate a frequency error correction signal which is input to a multiplier 304. Such that, if the buffered samples of the SCH are $r_n$, then for an assumed frequency error, the sample ($r_n$) must be corrected as frequency corrected sample $\tilde{r}_n = r_n e^{-j2\pi \Delta f n T_s}$, where $\tilde{r}_n$ is the frequency corrected sample, $\Delta f$ is the frequency correction term, and $T_s$ is the sampling interval. Multiplier 304 multiplies the error correction signal with the samples belonging to the SCH delayed (i.e., buffered data samples) to generate a frequency corrected stream of data samples.

In addition, the frequency reference source (i.e., the local oscillator 141) used by the receiving portion of the subscriber unit 100 must be corrected accurately enough so that samples may be decoded by FCCH, SCH detector 142 and/or demodulator 124. A difference ($\Delta f$) frequency correction control line 130 from the frequency error estimator 306 corrects the frequency of the oscillator 141 via a feedback path with the FCCH, SCH detector 142.

In addition, the FCCH samples are used by controller 144 to estimate the signal gain in order to adjust gain control, with an automatic gain control (AGC) feedback signal 138, to keep the received signal within the linear operating portion of the communication unit.

Subsequently, since the detector 142 has buffered data samples into a memory device from at least two time slots and it has detected the FCCH in the second time slot, then communication unit 100 knows the SCH is located in the previous time slot (i.e., the first time slot) of the frame and can now decode the previously stored SCH burst. In this SCH, accurate timing information and a specific synchronization word used by the serving base site for all normal control and traffic channel bursts is determined. The location of the correlation peak for the training sequence (synch word)in the SCH yields timing for the communication system to within a symbol period. In addition, one of the data fields in the SCH provides a frame number reference. From this SCH derived information, controller 144 can determine what the hopping pattern is and direct, via control lines 146 and 132, respectively, the hopping pattern generators 114 and 134 to generate the hopping pattern for the frequency synthesizers 116 and 128 to use, respectively. At this point, the communication unit is synchronized and is capable of communicating within the SFH communication system.

Once the communication unit is synchronized to the SFH communication system, the received signal is input to a mixer 120 which removes the effects of frequency hopping. Mixer 120 receives a carrier wave signal from frequency synthesizer 128 and mixes (e.g., multiplied) it with the received signal. The frequency synthesizer 128 receives a hopping pattern from hopping pattern generator 134 which was determined in the synchronization process.

Subsequently, a down-converter 122 converts the received signal to an intermediate frequency (IF) which can more easily be manipulated by other receiver components. The down-converted received signal is then input to a demodulator 124 which detects information bits 126 in the received signal. It will be appreciated by those skilled in the art that demodulator 124 performs the inverse of modulation operation performed prior to transmission of the signal over communication channel 112. For example the demodulator 124 may perform a coherent or non-coherent detection of the received signal and/or a maximum likelihood sequence estimate the information bits 126.

It will be appreciated by those skilled in the art that it may be desirable, after an initial acquisition of the SCH has been accomplished, to have a communication unit 100 in this communication system scan several frequencies by changing the output of the frequency synthesizer 128. Subsequently, at each frequency, a received signal strength indicator (RSSI) device 140 may be used to measure the signal strength of a received signal present. Subsequently, the communication unit 100 can use a controller 144 to prioritize the channels from highest to lowest signal strength (i.e., the closest base site communication unit will likely have the highest signal strength) so that subsequent communications with the communication system occur with the base site communication unit having the best reception by the subscriber. This is used in both initial registration of the subscriber unit and for handoff/handover purposes.

Also, it will be appreciated by those skilled in the art that the SCH may contain information on more that one hopping pattern and the controller 144 may hop the receiving portion of communication unit 100 according to a first and a second predetermined hopping pattern such that two control channels can be detected and the better control channel based on a comparison of measured signal quality be selected for subsequent use. Signal quality may be determined by bit error rate, relative signal strengths, strengths of correlation peaks, and/or delay spread.

FIG. I also shows a transmitting portion for a preferred embodiment subscriber communication unit 100 for use in a SFH communication system in accordance with the present invention. The transmitting portion operates in a substantially similar manner as the base site 200 transmitting portion described above, except that the subscriber unit 100 does not need to provide FCCH and SCH control channels. Information bits 102 are input to the transmitting portion of the subscriber communication unit 100. Information bits 102 may consist of digitized voice, data, or a combination thereof. Information bits 102 are input to a framing device 104 which divides the incoming information bits 102 into discrete groups which are to be transmitted as a group in individual time slots within a frame structure. The frame structure preferably is derived in part from a synchronization signal 146 coming from the receiving portion of the subscriber communication unit 146. This synchronization signal 146 is derived during the initial synchronization process for the receiver and is corrected over time by the receiver circuitry.

In an alternative embodiment, another type of synchronization signal 149 may be used by both the transmitting and receiving portion of the subscriber communication unit 100. This alternative synchronization signal 149 is generated as a function of global position satellite (GPS) information received over a communication channel 154 from one or more satellites 156 through an antenna 152 by a GPS receiver 150. GPS receiver 152 acquires the current time of day and/or location of the demodulator as the GPS information from satellite 156.

Either synchronization signal 146 or 149 is used by framing device 104 to synchronize a local oscillator 141 to the SFH communication system. The local oscillator 141 provides a clock signal to framing device 104 which in turn groups the incoming information bits 102 based on the clock signal.

In addition, either synchronization signal 146 or 149 is used by a hopping pattern generator 114 to generate at least one of a plurality of hopping patterns from a group of predetermined hopping patterns. Hopping pattern generator 114 is periodically clocked or stepped through different transitions by synchronization signal 146 or 149. This causes different, or shifted, .hopping patterns to be output to a frequency synthesizer 116. The hopping patterns are hopping patterns which are provided to an input of frequency synthesizer 116. Frequency synthesizer 116 generates a carrier wave in a particular narrow band of a predetermined broad frequency band for a brief period of time. Frequency synthesizer 116 uses the input hopping pattern to determine the particular frequency from within a set of frequencies in the broad frequency band at which to generate the carrier wave. As hopping pattern generator 114 is periodically clocked, the carrier wave frequency is hopped to different narrow band portions of the broad frequency band by frequency synthesizer 116. It will be appreciated by those skilled in the art that subscriber unit 100 may have only one frequency synthesizer and hopping pattern generator which provides carder waves to both the receiving and transmitting portions of base site 100.

The frequency hopping carrier wave is input to a modulator 106. Modulator 106 modulates the carrier wave with the framed (i.e., groups of) information bits output by framing device 106. A signal ready for transmission over a communication channel 112 is output by modulator 106. However, the transmission signal output by the modulator 106 may be too weak to transmit over the communication channel 112. If this is the case, the transmission signal may be amplified by a power amplifier 108 (PA), prior to its transmission by antenna 110.

Referring now to FIG. 2 a receiving portion for the preferred embodiment base site communication unit 200 is also shown. The receiving portion of the base site 200 operates in a substantially similar manner as described above in reference to the subscriber unit's receiving portion. The base site receiving portion differs in that it does not need to have FCCH and SCH detection circuitry to provide frequency hop synchronization, because the subscriber unit 100 is transmitting an information signal to the base site 200 which is synchronized to the frequency hopping pattern previously provided by the base site 200.

A signal is received by antenna 118 from over the communication channel 112 from the subscriber unit 100. This received signal is input to a mixer 120 which removes the effects of any frequency hopping. Mixer 120 receives a carrier wave signal from frequency synthesizer 128 and mixes (e.g., multiplied) it with the received signal. Frequency synthesizer 128 preferably operates in a substantially similar manner as frequency synthesizer 116 (i.e., receives a hopping pattern from a hopping pattern generator 134). It will be appreciated by those skilled in the art that a base site communication unit 200 may have only one frequency synthesizer and hopping pattern generator which provides carrier waves to both the receiving and transmitting portions of the communication unit 200. Similarly, a subscriber unit 100 may have only one frequency synthesizer and hopping pattern generator.

Once the effects of frequency hopping are removed, a down-converter 122 preferably converts the received signal to an intermediate frequency (IF) which can more easily be manipulated by other receiver components. The down-convened received signal may then be input to a demodulator 124 which detects information bits 126 in the received signal. Demodulator 124 performs the inverse of modulation operation which was performed on the signal prior to its original transmission. For example the demodulator 124 may perform a coherent or non-coherent detection of the received signal and/or may maximum likelihood sequence estimate to generate the information bits 126.

Figure 9:
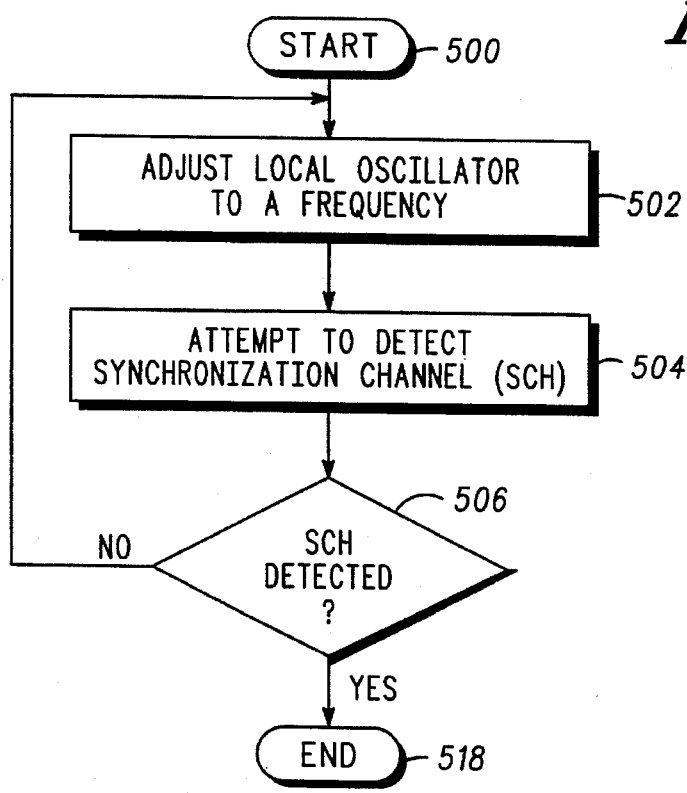
FIGS. 9 and 10 are flowcharts showing two different preferred embodiment techniques for detecting a synchronization channel time slot in accordance with the present invention.

As shown in elements 500–518 of the flowcharts in FIG. 9, SCH may be detected by the receiving portion of communication unit 100 or 200 with a preferred embodiment technique for detecting in accordance with the present invention. The technique consists of iteratively and sequentially setting 502 (i.e., adjusting) a local oscillator 141 (shown in FIG. 1 ) to a frequency until the synchronization channel time slot is detected 506,518. It will be appreciated by those skilled in the art that if the SCH is detected according to this algorithm shown in FIG. 9 that the FCCH will not be needed for acquisition.

Figure 10:
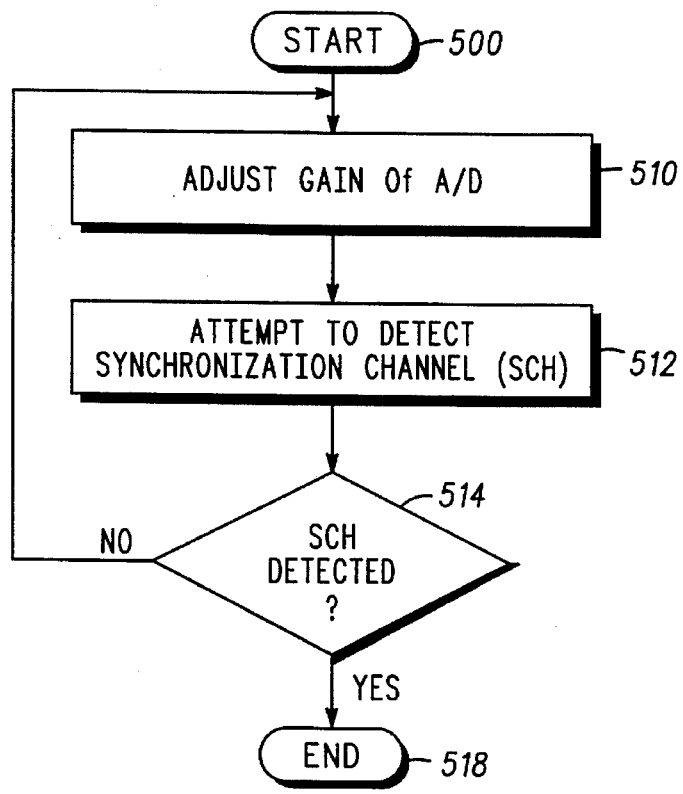

In a similar manner, as shown in elements 500–518 of FIG. 10 the preferred embodiment techniques for detecting FCCH and SCH may be augmented by iteratively and sequentially setting 510 (adjusting) a gain of a pre-amplifier within the FCCH, SCH detector 142 until the FCCH and/or SCH time slot is detected 512,514. The adjusting of the gain of the pre-amplifier adjusts the sensitivity of the receiver circuit such that distortion (i.e., clipping) is eliminated or reduced without sacrificing sensitivity in detecting the received signal.

If the communication units 100 and 200 operating in the SFH communication system utilize GPS receivers (e.g., receiver 150), then absolute timing of all of the communication units can be maintained and the hopping pattern can be determined as a function of the time of day and/or location information within the received GPS information. It will be appreciated by those skilled in the art that a separate non-hopping pilot channel 148 (shown in FIG. 1) or a public switch telephone network (PSTN) timing signal 149 (shown in FIG. 2) which provides absolute timing information to all communication units operating in the SFH communication system may be substituted for a GPS receiver.

For example, if a mechanism for obtaining absolute timing was available, then a subscriber communication unit would be able to determine where it was located with regard to the nearest base station. In addition, the time of day could also be determined from the GPS information. The location information is then used to select a base station and identify a hopping sequence for that base site. The time of day is use to determine where, in a day long sequence of a hopping pattern (i.e., a spreading code), to start frequency hopping.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A communication unit for use in a communication system, the communication unit comprising a transmitter, a modulator coupled to the transmitter, and hopping means coupled to the modulator for hopping a plurality of communication frames over a plurality of carrier frequencies according to a predetermined hopping pattern, at least one of the plurality of communication frames comprising a synchronization channel time slot, the synchronization channel time slot comprising data bits, the hopping means deriving the predetermined hopping pattern from the data bits.

2. The communication unit of claim 1 wherein the communication system operates according to an air interface selected from the group consisting of Digital Cellular System 1800 MegaHertz and Global System for Mobile Communications.

3. The communication unit of claim 1 wherein each of the plurality of communication frames comprises a plurality of time slots, at least one of the plurality of time slots of a particular frame of the plurality of communication frames comprises the synchronization channel time slot.

4. The communication unit of claim 3 wherein another of the plurality of time slots of the particular frame comprises a frequency correction channel time slot, the frequency correction channel time slot comprising information for indicating a location of the synchronization channel time slot within the particular communication frame.

5. The communication unit of claim 1 wherein the synchronization channel time slot comprises data bits from which a plurality of hopping patterns is derived.

6. A communication unit for use in a communication system, the communication unit comprising a transmitter, a modulator coupled to the transmitter, and hopping means coupled to the modulator for hopping a plurality of communication frames over a plurality of carrier frequencies according to a predetermined hopping pattern, the hopping means determining the predetermined hopping pattern from a detected global position satellite information.

7. A communication unit for use in a communication system, the communication unit comprising a receiver, a demodulator coupled to the receiver, and:
   (a) signal acquisition means coupled to the receiver for initially acquiring a predetermined hopping pattern which specifies the sequence over which a plurality of communication frames are hopped over a plurality of carrier frequencies, the signal acquisition means comprising detecting means for detecting a synchronization channel time slot within a communication frame, the synchronization channel time slot comprising data bits from which the predetermined hopping pattern is derived; and
   (b) hopping means, coupled to the signal acquisition means, for hopping a receiving frequency of the signal acquisition means according to the predetermined hopping pattern to detect a control channel.

8. The communication unit of claim 7 wherein each of the plurality of communication frame comprises a plurality of time slots, at least one of the plurality of time slots of a particular communication frames comprising the synchronization channel time slot.

9. The communication unit of claim 8 wherein another of the plurality of time slots of the particular communication frame comprises a frequency correction channel time slot, the frequency correction channel time slot comprising information for indicating a location of the synchronization channel time slot within the particular communication frame.

10. The communication unit of claim 9 wherein the signal acquisition means comprises:

(a) memory means, coupled to the detecting means, for concurrently storing information from a plurality of time slots including the frequency correction channel time slot and the synchronization channel time slot wherein the information from the frequency correction channel time slot indicates that the synchronization channel time slot is located within an earlier transmitted time slot within the particular communication frame; and (b) determining means, coupled to the memory means, for retrieving synchronization channel time slot information from the stored particular earlier transmitted time slot and determining the predetermined hopping pattern.

11. The communication unit of claim 10 wherein the determining means comprises means for frequency error correcting the stored particular earlier transmitted time slot based on information from the frequency correction channel time slot prior to retrieving synchronization channel time slot information from the stored particular earlier transmitted time slot.

12. The communication unit of claim 9 wherein:

(a) the frequency correction channel time slot information indicates that the synchronization channel time slot is located within a later transmitted time slot within the particular communication frame; and (b) the signal acquisition means comprises determining means, coupled to the detecting means, for acquiring information from the synchronization channel time slot from the particular later transmitted time slot and determining the predetermined hopping pattern from such information.

13. The communication unit of claim 7 wherein the detecting means detects the synchronization channel time slot by iteratively and sequentially setting a local oscillator to a frequency until the synchronization channel time slot is detected.

14. The communication unit of claim 7 wherein the detecting means detects the synchronization channel time slot by iteratively and sequentially setting a gain of the detecting means until the synchronization channel time slot is detected.

15. The communication unit of claim 7 wherein:

(a) the synchronization channel time slot comprises data bits from which a plurality of predetermined hopping patterns is derived;

(b) the hopping means comprises:

(i) means for hopping a frequency of the receiver according to a first and a second predetermined hopping pattern to detect a first and a second control channel respectively; and (ii) selection means for selecting one of the first and the second predetermined hopping patterns to continue hopping the receiver based on a comparison of a measured signal quality of the first and the second detected control channel.

16. A communication unit for use in a communication system, the communication unit comprising a receiver, a demodulator coupled to the receiver, and:

(a) global position satellite detecting means coupled to the receiver for detecting global position satellite information;

(b) signal acquisition means, coupled to the global position satellite detecting means, for acquiring a predetermined hopping pattern by utilizing the detected global position satellite information, the predetermined hopping pattern specifying the sequence over which a plurality of communication frames are hopped over a plurality of carrier frequencies; and (c) hopping means, coupled to the signal acquisition means, for hopping a frequency of the receiver according to the predetermined hopping pattern to detect a control channel.

17. A communication unit for use in a communication system, the communication unit comprising a transmitter, a modulator coupled to the transmitter, and hopping means coupled to the modulator for hopping a plurality of communication frames over a plurality of carrier frequencies according to a predetermined hopping pattern, each of the plurality of communication frames comprising a plurality of time slots, at least one of the plurality of time slots of a particular communication frame of the plurality of communication frames comprises a synchronization channel time slot and another of the plurality of time slots of the particular communication frame comprises a frequency correction channel time slot, the synchronization channel time slot comprising data bits, the hopping means deriving the predetermined hopping pattern from the data bits, the frequency correction channel time slot comprising information for indicating a location of the synchronization channel time slot within the particular communication frame.

18. A communication unit for use in a communication system, the communication unit comprising a receiver, a demodulator coupled to the receiver, and:

(a) signal acquisition means coupled to the receiver for initially acquiring a predetermined hopping pattern which specifies the sequence over which a plurality of communication frames are hopped over a plurality of carrier frequencies, each of the plurality of communication frames comprising a plurality of time slots, at least one of the plurality of time slots of a particular communication frame of the plurality of communication frames comprising a synchronization channel time slot and another of the plurality of time slots of the particular communication frame comprising a frequency correction channel time slot, the synchronization channel time slot comprising data bits and the frequency correction channel time slot comprising information for indicating a location of the synchronization channel time slot within the particular communication frame, the signal acquisition means comprising detecting means for detecting the synchronization channel time slot and the frequency correction channel time slot within the particular communication frame; and (b) hopping means, coupled to the signal acquisition means, for determining the predetermined hopping pattern from the data bits and for hopping a frequency of the receiver according to the predetermined hopping pattern to detect a control channel.

19. The communication unit of claim 18 wherein the signal acquisition means further comprises:

(a) memory means, coupled to the detecting means, for concurrently storing information from a plurality of time slots including the frequency correction channel time slot and the synchronization channel time slot wherein the frequency correction channel time slot information indicates that the synchronization channel time slot is located within a particular earlier transmitted time slot within the particular communication frame; and (b) determining means, coupled to the memory means, for retrieving synchronization channel time slot information from the particular earlier transmitted time slot stored in the memory means and determining the predetermined hopping pattern therefrom.

20. The communication unit of claim 19 wherein the determining means comprises means for frequency error correcting the stored particular earlier transmitted time slot based on information from the frequency correction channel time slot prior to retrieving synchronization channel time slot information from the stored particular earlier transmitted time slot.

21. The communication unit of claim 18 wherein:

(a) the frequency correction channel time slot information indicates that the synchronization channel time slot is located within a particular later transmitted time slot within the particular communication frame; and (b) the signal acquisition means comprises determining means, coupled to the detecting means, for acquiring synchronization channel time slot information from the particular later transmitted time slot and determining the predetermined hopping pattern therefrom.

22. A communication unit for use in a communication system, the communication unit comprising a receiver, a demodulator coupled to the receiver, and:

(a) signal acquisition means coupled to the receiver for initially acquiring a predetermined hopping pattern which specifies the sequence over which a plurality of communication frames are hopped over a plurality of carrier frequencies, the signal acquisition means comprising detecting means for detecting a synchronization channel time slot within a particular communication frame of the plurality of communication frames, the synchronization channel time slot comprises data bits from which a first and a second predetermined hopping pattern is derived;

(b) hopping means, coupled to the signal acquisition means, for hopping a frequency of the receiver according to the first and the second predetermined hopping pattern to detect a first and a second control channel respectively;

(c) signal quality measurement means, coupled to the hopping means, for measuring the signal quality of the first and the second detected control channel; and (d) selection means, coupled to the signal quality measurement means, for selecting one of the first and the second predetermined hopping pattern to continue hopping the frequency of the receiver based on a comparison of the measured signal quality of the first and the second detected control channel.

23. A method for determining a hopping pattern by a communication unit for use in a frequency hopping communication system, comprising:

(a) scanning a particular set of frequencies for a communication frame including a synchronization channel time slot;

(b) detecting the synchronization channel time slot within the communication frame; and (c) determining a predetermined hopping pattern which specifies the sequence over which a plurality of the communication frames are hopped over a plurality of carrier frequencies from data bits within the synchronization channel time slot.

24. The method of claim 23 wherein the step of determining comprises using the data bits within the synchronization channel time slot to acquire the predetermined hopping pattern according to a step selected from the group consisting of:

(a) retrieving the predetermined hopping pattern from a lookup table of hopping patterns;

(b) deriving a carrier frequency of a next communication frame within the predetermined hopping pattern; and (c) deriving the predetermined hopping pattern as a function of the data bits within the synchronization channel time slot.

25. The method of claim 23 wherein each communication frame comprises at least one time division multiple access frame having a plurality of time slots, at least one of the plurality of time slots of a particular hop frame comprising the synchronization channel time slot, the step of determining the predetermined hopping pattern further comprises:

(a) acquiring a frame number according to a step selected from the group consisting of:

(i) determining the frame number from the synchronization channel time slot data bits; and (ii) determining a reduced frame number from a plurality of synchronization channel time slot data bits, the reduced frame number identifying a co-set of communication frames including a single synchronization channel time slot within a predetermined communication frame of the co-set of communication frames, and subsequently determining the frame number from the determined reduced frame number and the predetermined communication frame of the co-set of communication frames; and (b) deriving the predetermined hopping pattern from the acquired frame number according to a step selected from the group consisting of:

(i) using the acquired frame number to retrieve the particular hopping pattern from a lookup table of hopping patterns; and (ii) deriving the particular hopping pattern as a function of the acquired frame number.

26. The method of claim 23 wherein each of the plurality of communication frames comprises a plurality of time slots, at least one of the plurality of time slots of a particular communication frame of the plurality of communication frames comprising the synchronization channel time slot, and at least another of the plurality of time slots of the particular communication frame comprising a frequency correction channel time slot, the frequency correction channel time slot information indicating that the synchronization channel time slot is located within an earlier transmitted time slot within the particular communication frame, the step of detecting the synchronization channel time slot comprises:

(a) concurrently storing information from a plurality of time slots including the frequency correction channel time slot and the synchronization channel time slot; and (b) retrieving synchronization channel time slot information from the stored particular earlier transmitted time slot and determining the predetermined hopping pattern therefrom.

27. The method of claim 23 wherein each of the plurality of communication frames comprises a plurality of time slots, at least one of the plurality of time slots of a particular communication frame of the plurality of communication frames comprising the synchronization channel time slot, and at least another of the plurality of time slots of the particular communication frame comprising a frequency correction channel time slot, the frequency correction channel time slot information indicating that the synchronization channel time slot is located within a later transmitted time slot within the particular communication frame, the step of detecting the synchronization channel time slot comprises the step of acquiring synchronization channel time slot information from the particular later transmitted time slot and determining the predetermined hopping pattern therefrom.

28. The method of claim 23 wherein the step of detecting the synchronization channel time slot comprises iteratively and sequentially setting a local oscillator to a frequency until the synchronization channel time slot is detected.

29. The method of claim 23 further comprising the step of detecting a control channel by hopping the frequency of a receiver according to the predetermined hopping pattern.

30. The method of claim 29 wherein the synchronization channel time slot comprises data bits from which a plurality of predetermined hopping patterns is derived, the step of hopping comprises (a) hopping a frequency of the receiver according to a first and a second predetermined hopping pattern to detect a first and a second control channel respectively; and (b) selecting one of the first and the second predetermined hopping pattern to continue hopping the frequency of the receiver based on a comparison of a measured signal quality of the first and the second detected control channel.

31. A method for acquiring a hopping pattern by a communication unit for use in a frequency hopping communication system, comprising:

(a) detecting a global position satellite information; and (b) acquiring a predetermined hopping pattern by utilizing the detected global position satellite information, the predetermined hopping pattern specifying the sequence over which a plurality of communication frames are hopped over a plurality of carrier frequencies.

* * * * *

UNITED STATES PATENT AND TRADEMARK OFFICE
CERTIFICATE OF CORRECTION

PATENT NO. : 5,506,863
DATED : 4/9/96
INVENTOR(S) : Meidan, et al.

It is certified that error appears in the above-indentified patent and that said Letters Patent is hereby corrected as shown below:

Column 13, line 4 reads "communication frame" should be --communication frames--.
Column 13, line 6 reads "communication frames" should be --communication frame--.
Column 13, line 67 reads "channel respectively" should be --channel, respectively--.
Column 15, line 54 reads "channel respectively" should be --channel, respectively--.
Column 18, line 11 reads "channel respectively" should be --channel, respectively--.

Signed and Sealed this

Sixth Day of August, 1996

Attest:

BRUCE LEHMAN

*Attesting Officer*    Commissioner of Patents and Trademarks